United States Patent Office 3,062,888
Patented Nov. 6, 1962

3,062,888
PREPARATION OF TERTIARY DIAMINE DERIVATIVES OF DIMERS OF DIENES
Hans Z. Lecher, Plainfield, N.J., and Irving L. Mador and Chase D. Tonne, Cincinnati, Ohio, assignors to National Distillers and Chemical Corporation, New York, N.Y., a corporation of Virginia
No Drawing. Filed Feb. 4, 1958, Ser. No. 713,100
5 Claims. (Cl. 260—583)

The present invention relates to a process for preparation of ditertiary diamine derivatives of dimers of conjugated dienes. More specifically, the invention relates to a process for production, from a conjugated diene such as butadiene, of ditertiary diamine derivatives of the dimer of butadiene.

The process embodied herein comprises reacting a diene, as for example butadiene, in a suitable reaction medium in presence of free amino radicals derived from a N-halo-secondary amine under conditions to produce a ditertiary diamine corresponding to a product of addition of two molecules of the secondary amino radical to two units of the diene. Thus, by such a reaction, there is effected the simultaneous coupling of two molecules of the diene with addition of one secondary amino radical per molecule of the diene in the dimer.

In a specific embodiment, the process comprises reacting a diene (e.g., butadiene) in a suitable solvent (e.g., a saturated aliphatic alcohol) in the presence of free amino radicals produced by oxidation-reduction reaction between a reductant metal salt (e.g., titanous chloride) and a N-halo-secondary amine (e.g., N-chlorodimethylamine) whereby there is produced a reaction mixture comprising the ditertiary diamine derivative of the dimer of the diene, e.g., a N,N,N',N'-tetramethyldiamine-octadiene. As dimerization may occur in units such as (a)

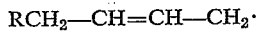

and (b) $RCH_2$—$\overset{.}{C}H$—$CH=CH_2$, the dimer products comprise a mixture of diamine dimers formed by dimerization of two units of (a) whereby a straight chain product (1,8-bis-dimethylamino-2,6-octadiene) is formed, in mixture with either an isomeric diamine of a dimer formed by one unit of (a) with one unit of (b), or by two units of (b), or both.

In another embodiment, the process may be carried out in continuous manner. Thus, illustrated by use of titanous chloride as a reductant in the described reaction, the titanic chloride ($TiCl_4$) that is formed and is present in the product mixture of the reaction is reduced back to the titanous by catalytic reduction with hydrogen, and the titanous salt is recycled to the reaction in which formation of the diamino derivatives of the dimer of the diene is being carried out. Other embodiments and additional improved aspects of the process embodied herein are set forth in the specific examples presented hereinafter.

For providing free amino radicals in a process as embodied herein, use is made of a N-halosecondary amine for oxidation-reduction reaction with a suitable reductant metal salt whereby liberation of a free secondary amino radical occurs. For example, a suitable method for providing such free secondary amino radicals is the use of a N-chlorodialkylamine (e.g., N-chlorodimethylamine) and a reductant metal such as titanous chloride, titanous acetate, stannous chloride, manganous chloride, vanadous chloride, and the like, which undergo oxidation-reduction reaction with the N-halodialkylamine and as is illustrated by use of a titanous salt, to form a free secondary amino radical. Also contemplated herein is the production of free secondary amino radicals from N-halosecondary amines by means of radiative decomposition including ultraviolet light, nuclear radiations such as gamma rays or electrons, or by electrochemical reduction.

With reference to the utilization of a N-halosecondary amine as the source of the free secondary amino radicals, the N-halosecondary amine is preferably used in the form of a solution in a suitable inert solvent. A particularly preferred solvent is diethylether but also contemplated for such usage are solvent substances such as dipropylether, benzene, and others. In embodiments of this invention, N-haloamines of the following structures may be used:

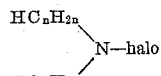

and

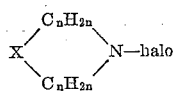

wherein X is oxygen or a $CH_2$ radical, $n$ is an integer of 1 to 6, and "halo" may be chlorine, bromine or iodine. Specific examples include N-chlorodiethylamine, N-chlorodipropylamine, N-bromodimethylamine, N-chloromethylethylamine, N-chloro-di-n-hexylamine, N-chloropiperidine, N-chloromorpholine, etc.

In carrying out the process of this invention, the reaction between the diene and the free secondary amino radicals is carried out in a solvent system that is inert with respect to the reactants and the diamine product. For such a purpose, certain organic solvents are suitable, such as for example, the alcohols of the methanol series and particularly the relatively low molecular weight members of that series such as methanol, ethanol, isopropanol, and the like; and, generally, such alcohols of from 1 to 4 carbon atoms. Mixtures of such alcohols can also be used as well as mixtures thereof with other substances, such as diethyl ether, dioxane, dimethyl cellosolve, benzene, etc. Specific mixtures include those of methanol and dioxane, methanol and ethanol, etc. Preferably, the solvent or solvent mixture should have a solubility for the source of secondary amino radicals sufficiently great that the reaction may proceed at a reasonable rate, and a relatively low solubility for the diamine product. Thus, illustrated by the use of a N-chloro-dimethylamine, it may be added in solution in one solvent and the reductant (e.g., titanous chloride) in another solution in which case it is desirable that the solvents be chosen so that the solubility in each case be high.

The process embodied herein may be carried out with use of a diene of which butadiene is a particularly suitable embodiment. However, the process may be carried out with use of other dienes, including for example lower molecular weight dienes such as isoprene, dimethyl butadiene, the pentadienes, such as methyl 1,3-pentadiene, as well as cyclic dienes such as cyclohexadiene and cyclopentadiene, and others. Depending on the particular diene employed, the process embodied herein is directed to the preparation of tertiary diamino dimers of such compounds.

For the described reaction, the temperature employed may be carried over a rather wide range such, for example, from −30° C. to about 75° C. with a preferred range being about 0° C. to about 40° C. Though temperatures lower than about 0° C. can be used, they are generally not preferred as the reaction rate tends to decrease whereas temperatures higher than about 40° C., though suitable due to an increase in rate of reaction, require use of more expensive pressurized vessels.

In carrying out the reaction that results in formation of the diamino products corresponding to addition of two secondary amino radicals to two units of the diene and which reaction may be illustrated by use of N-chlorodimethylamine and titanous chloride for formation of the free secondary amino radicals, the N-chloro compound and titanous chloride are generally used in equivalent amounts to obtain substantially complete utilization of these reagents. In certain instances, however, to protect the reacted solution against oxidation, an excess (e.g., about 5%) of titanous chloride may be introduced. The diene may be present in stoichiometric amount or in excess such, for example, up to about an eight fold excess but, preferably, from about 1.3 to about 2.0 equivalents are used with the excess diene compound being recovered, if desired, at the conclusion of the reaction.

The N-halo compound and the titanous chloride may be added concurrently to the reaction mixture and, preferably, the N-halo compound is maintained in excess. With respect to the diene, it may be all added initially or, if desired, it may be metered in during the course of the reaction, preferably at a rate such as to maintain an excess of the diene in the mixture undergoing reaction.

In the use of a reductant metal salt (e.g., titanous chloride) for the reaction to form the free amino radicals, it may be used in the form of a solid alcoholate or as a solution in a solvent, preferably the reaction medium employed for the diamine-forming reaction. To prepare such compounds (e.g., alcoholates of titanous chloride), a concentrated solution of $TiCl_4$ in a suitable alcohol (e.g., methanol) may be subjected to catalytic hydrogenation to reduce the $TiCl_4$ to titanous chloride, the $TiCl_4$ being used in an amount that exceeds the solubility of the titanous compound in the solvent for the $TiCl_4$; or an alcohol solution of titanous chloride may be subjected to distillation to remove the solvent and precipitate the solid titanous compound. For reduction of $TiCl_4$ to form the titanous chloride, the solution of the $TiCl_4$ can be subjected to hydrogen under pressure (e.g., from about 14 up to several thousand pounds per square inch) in the presence of a suitable catalyst such as Adams catalyst, platinum on carbon, palladium on carbon, and others.

Following completion of the diamine-forming reaction, the residual solution of $TiCl_4$ (when the reductant is titanous chloride) in the reaction medium (e.g., alcohol) can be reduced to titanous by catalytic hydrogenation and reused as the reductant in the free amino radical-forming reaction. Alcoholic solutions of $TiCl_4$ contain free HCl due to esterification.

$$TiCl_4 + ROH \rightarrow Ti(OR)Cl_3 + HCl$$

etc.

The amount of acid, e.g., hydrochloric acid, may be decreased by distillation or by adding anhydrous ammonia whereby ammonium chloride is precipitated and the acid, e.g., hydrochloric acid, may be increased by addition of the anhydrous gas. Any of the steps of reduction to titanous chloride, dimerization, and recovery of the diamino product as per specific embodiments herein may be carried out with more or less than the normal acid concentration resulting from the esterification. Generally, it is suitable to perform these steps without effecting any change in the normal concentration.

If desired, the diamino dimer of the diene may be subjected to hydrogenation to produce the corresponding saturated diamine. Thus, in the case of a reaction as embodied herein utilizing butadiene as the starting diene and N-chlorodimethylamine as the source of secondary amino radicals, the product of the dimerization reaction corresponding to addition of one secondary amino group per unit of butadiene is a N,N,N',N'-tetramethyldiamino-octadiene which may be hydrogenated to form the corresponding saturated product, i.e., N,N,N',N'-tetramethyldiamino-octane and, specifically, 1,8-bis-dimethylamino-octane.

In order to further describe the invention, an embodiment thereof is set forth hereinafter. With respect thereto, however, it should be understood that such an embodiment is set forth for illustrative and not limitative purposes.

*Example*

A solution of N-chloro dimethylamine in diethylether was prepared from dimethylamine hydrochloride and sodium hypochlorite according to the method described in J. Am. Chem. Soc. 55, 3003 (1933). The final solution contained 0.248 moles of the chloramine in 665 ml. of ether.

The chloramine solution was added dropwise over a 55 minute period to a flask containing initially 65 ml. of ether and 65 ml. methanol. Simultaneously, and at an equivalent stoichiometric rate was added a solution of 0.260 titanous chloride in 600 ml. of methanol. Over the addition period 1.24 moles of butadiene (five times the theoretical amount) was condensed into the flask by means of a Dry Ice reflux condenser. Rapid stirring was maintained and the temperature held at 10° to 12° C. by means of an external cooling bath.

From the final solution the excess butadiene and part of the methanol were removed by distillation. Water was added and then caustic to make the solution 25% in sodium hydroxide. The slurry was extracted with isopropanol and then the isopropanol removed by distillation. The residue consisted of crude N,N,N',N'-tetramethyldiamino-octadiene. The product was distilled under 0.05 mm. pressure and boiled in the range 53° to 63° C. The infrared spectrum showed the presence of olefin and methyl groups and carbon-nitrogen bonds. No bonds were observed in the regions where an N-H structure would absorb. The results of an elemental analysis were:

|  | Percent C | Percent H | Percent N |
| --- | --- | --- | --- |
| Found | 73.26 | 12.45 | 14.30 |
| Calc. for $C_{12}H_{24}N_2$ | 73.46 | 12.27 | 14.27 |

Hydrogenation of the unsaturated diamine gave N,N,N',N'-tetramethyldiamino-octane boiling at 43–55° C./0.09 mm. vacuum.

The tertiary diamino products produced by practice of this invention possess utility for many purposes including use as lubricating oil additives, as catalyst activators, and epoxy resin hardeners. They are also useful chemical intermediates, such as for preparation of di-quarternary ammonium salts and as to the unsaturated diamines, an illustration of which is the aforesaid N,N,N',N'-tetramethyldiamino-octadiene, they are useful for insecticidal or fungicidal purposes.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of diamine dimers of conjugated dienes which comprises carrying out an oxidation-reduction reaction by contacting a lower molecular weight aliphatic conjugated diolefin hydrocarbon dissolved in a lower alkyl alcohol and a N-halo-secondary dialkylamine selected from the group consisting of the N-chloro-secondary dialkylamines and the N-bromo-secondary dialkylamines in the presence of titanous chloride, at a temperature between about −30° to about 75° C., the hydrocarbon being in at least stoichiometric amount and the titanous chloride being in amount substantially equivalent to the dialkylamine, thereby producing an addition product of the two dialkylamino groups to a dimerized diolefin.

2. A process, as defined in claim 1, wherein the diene is butadiene.

3. A process, as defined in claim 1, wherein the N-halo secondary dialkylamine is N-chlorodimethylamine and the salt is titanous chloride.

4. A process which comprises reacting titanous chloride and N-chlorodimethylamine in a liquid phase substantially non-aqueous reaction medium comprising butadiene dissolved in methanol at a temperature of from −30 to 75° C. thereby producing N,N,N′,N′-tetramethyl-diamino-octadiene, the butadiene being in at least stoichiometric amount, and the titanous chloride being approximately equivalent to the amount of N-chlorodimethylamine.

5. A process, as defined in claim 4, wherein the N,N,N′,N′-tetramethyldiaminooctadiene is hydrogenated to N,N,N′,N′-tetramethyldiaminooctane.

References Cited in the file of this patent

UNITED STATES PATENTS 2,567,109  Howard _____ Sept. 4, 1951

FOREIGN PATENTS 542,162  Canada _____ June 11, 1957

OTHER REFERENCES

Davis et al.: Journal of the Chemical Society, No. 4 (1951), pages 2563–2567.

Seaman et al.: Journal of the Chemical Society, No. 4 (1954), pages 4690–4691.